United States Patent [19]

Spaude et al.

[11] Patent Number: 4,941,693
[45] Date of Patent: Jul. 17, 1990

[54] CONNECTOR FOR AIR DUCTS

[75] Inventors: William C. Spaude, Seminole; Tod A. Spaude, Bushnell; Amy L. Spaude, Daytona Beach, all of Fla.

[73] Assignee: Spiral Specialties, Inc., Bushnell, Fla.

[21] Appl. No.: 340,086

[22] Filed: Apr. 18, 1989

[51] Int. Cl.⁵ .............................................. F16L 25/00
[52] U.S. Cl. ..................................... 285/331; 285/371; 285/424; 285/915; 285/906
[58] Field of Search ............... 285/331, 251, 398, 371, 285/424, 903, 177, 915, 906

[56] References Cited

U.S. PATENT DOCUMENTS

| | | |
|---|---|---|
| 394,479 | 12/1888 | Evans . |
| 2,275,572 | 3/1942 | Somers .......................... 285/398 X |
| 2,535,186 | 12/1950 | Anderson ............................. 285/185 |
| 2,625,872 | 1/1953 | Follansbee et al. ...... 138/DIG. 4 X |
| 3,415,543 | 12/1960 | Keating .......................... 285/331 X |
| 3,689,114 | 9/1972 | Meserole .............................. 285/424 |
| 3,905,621 | 9/1975 | DeMarco ........................ 285/177 X |
| 4,558,892 | 12/1985 | Daw ..................................... 285/331 |
| 4,669,762 | 6/1987 | Jenkins ................................ 285/331 |

Primary Examiner—Dave W. Arola
Attorney, Agent, or Firm—Oltman and Flynn

[57] ABSTRACT

A connector for connecting end-to-end two spiral-wound sheet metal air ducts. The connector is an annular structure with opposite end segments, each of which presents an annular recess or groove which is open at its outer end and closed at its inner end and filled with sealing mastic there. The dimension of each recess or groove transverse to the longitudinal axis of the ducts and the connector is substantially equal to the maximum thickness of the corresponding duct (i.e., where its spiral rib is located) so that each duct has a snug sliding fit in the corresponding recess.

10 Claims, 3 Drawing Sheets

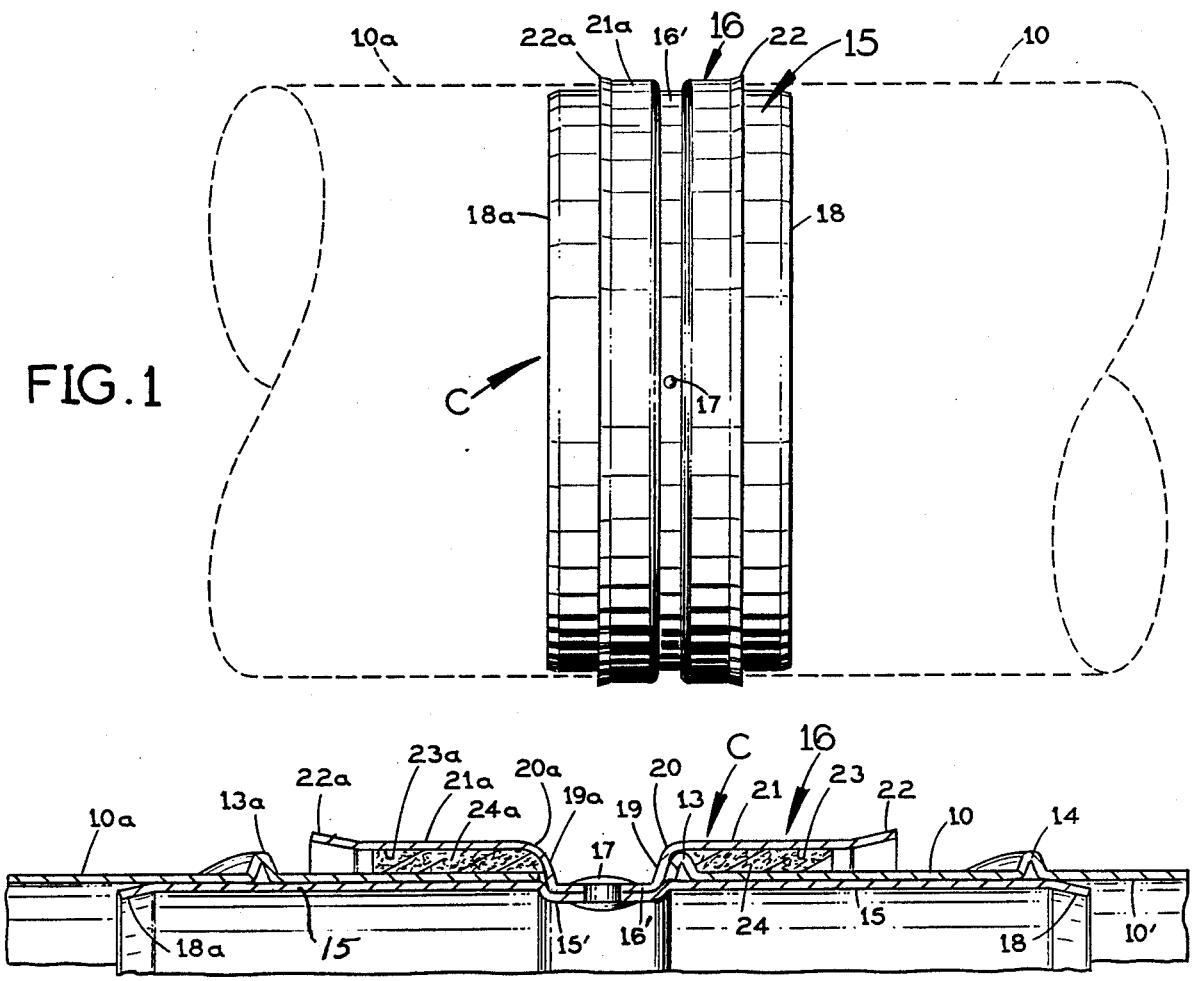
FIG. 1
FIG. 3
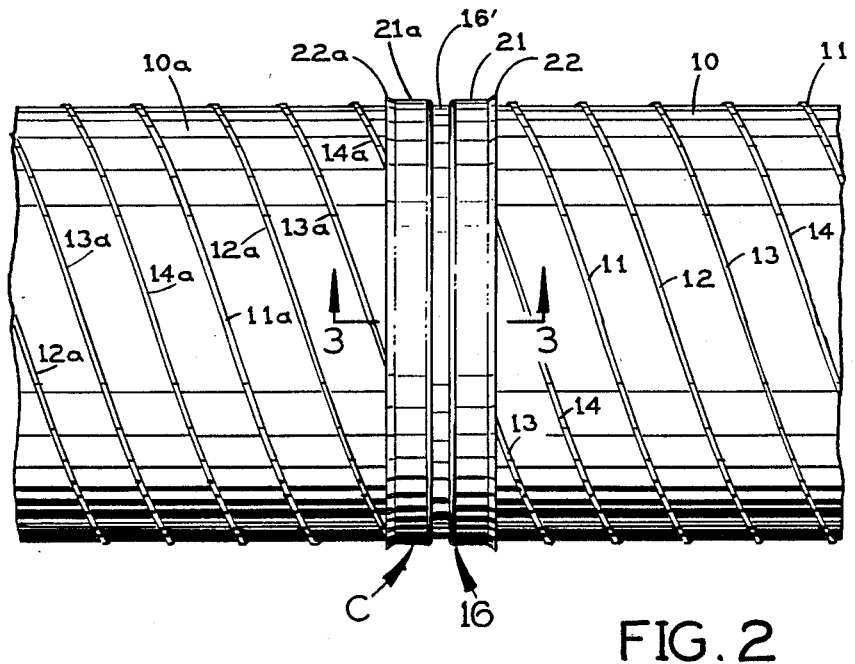
FIG. 2

CONNECTOR FOR AIR DUCTS

SUMMARY OF THE INVENTION

This invention relates to a connector for interconnecting air ducts in an air conditioning, heating or ventilating system in substantially air-tight fashion.

A principal object of this invention is to provide a novel connector for connecting end-to-end two spiral-wound sheet metal air ducts of conventional design.

Another object of this invention is to provide such a connector which facilitates the installation of air ducts for an air conditioning, heating or ventilating system in a building.

Further objects and advantages of this invention will be apparent from the following detailed descriptions of presently preferred embodiments which are illustrated schematically in the accompanying drawings.

Preferably, the connector of the present invention has opposite end segments, each presenting an annular recess or groove which has an open outer end and a closed inner end filled with mastic. The dimension of each groove transverse to the conjoint longitudinal axes of the ducts and the connector is such that it slidably but snugly receives the corresponding air duct, including the spiral rib on the outside of the duct. The mastic flows around the inserted end of the duct and provides an air-tight seal between the connector and the outside of the duct. At each groove the connector has an annular outside member and an annular inside member that projects axially beyond the outside member to facilitate its attachment to the air duct, with the inside member fitting snugly but slidably inside the air duct.

DESCRIPTION OF THE DRAWINGS

FIG. 1 is a side elevation of the first embodiment of the present invention for connecting end-to-end two spiral-wound air ducts of the same diameter;

FIG. 2 is a side elevation showing this connector attached to the air ducts;

FIG. 3 is an enlarged longitudinal section taken along the line 3—3 in FIG. 2 and showing the ends of the ducts received in the grooves in the connector;

Figure 4:
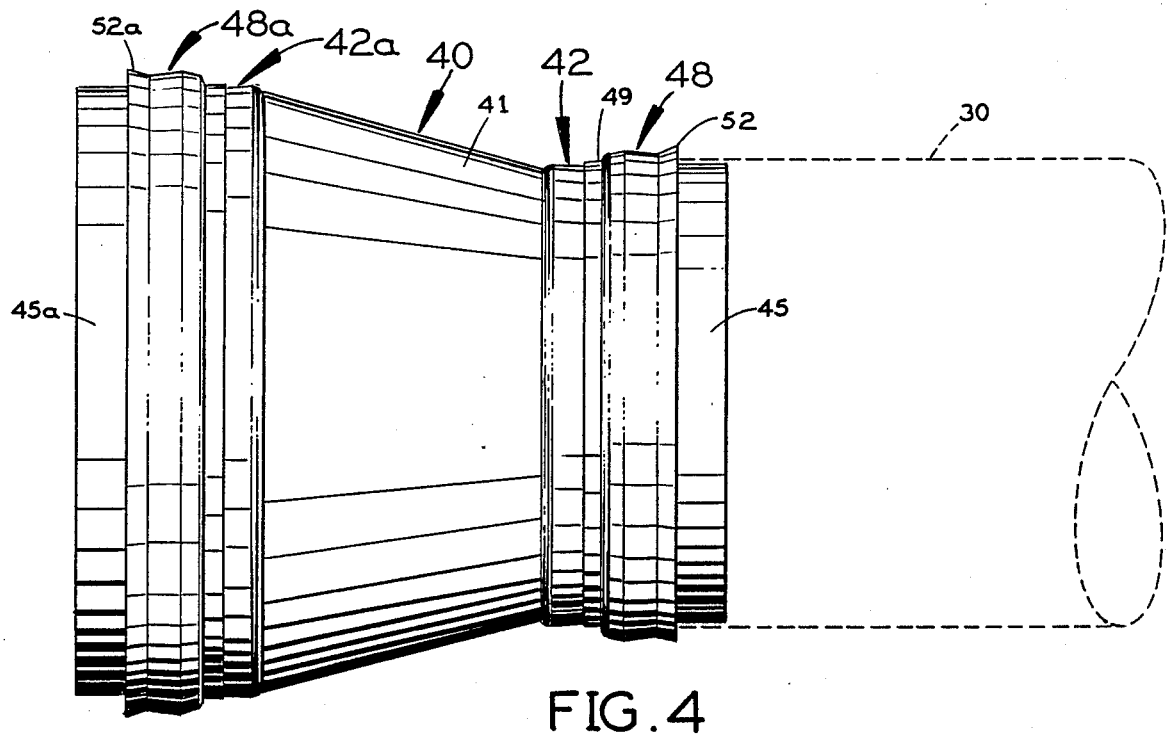
FIG. 4 is a side elevation of a second embodiment of this invention for connecting two spiral-wound ducts of different diameters.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

FIGS. 1–3 show a first embodiment of the present invention which connects end-to-end two spiral wound, ribbed, sheet metal ducts of the same diameter.

As shown in FIG. 2, the spiral-wound, ribbed duct 10 on the right side is a generally cylindrical sheet metal body with outwardly projecting spiral ribs on the outside at evenly spaced intervals along its length. This duct is a commercially available product. Every fourth spiral rib 11 is a folded-over seam that extends radially out from the side wall of the duct. On the outside it has a flat spirally-extending surface. The other three ribs 12, 13 and 14 are much narrower on the outside longitudinally of the duct and they project farther radially out from the main body of the duct than the seam rib 11. As shown for the ribs 13 and 14 in FIG. 3, each of these three ribs 12, 13 and 14 is formed by outwardly deformed segments of the duct wall pressed against each other and forming two sides of a triangle with a rounded apex. Duct 10 has an inside periphery 10' (FIG. 3) which is cylindrical except at the narrow spiral cracks or discontinuities formed at the inner ends of the spiral ribs.

The duct 10a on the left side of the connector is identical to duct 10, and a fourth rib 11a like the fourth rib 11 on duct 10 and three narrower, more prominent ribs 12a, 13a and 14a like the ribs 12, 13 and 14 on duct 10.

For connecting the spiral-wound ducts 10 and 10a end-to-end, the connector C of the present invention is a generally cylindrical structure with oppositely-facing recesses or grooves for slidably receiving and tightly holding the adjacent ends of the two ducts. As shown in FIG. 3, the connector has an annular inner body 15, which is cylindrical for most of its length, and an annular outer body 16, which is rigidly attached to the inner body by rivets 17 midway along the length of each. The inner body 15 has a generally cylindrical wall of uniform inside diameter and uniform outside diameter except at a radially inwardly offset, annular, central segment 15' and at inwardly bent, annular, end lips 18 and 18a on its opposite ends. The outer body 16 has an inwardly offset, cylindrical, central segment 16' that fits snugly around the central segment 15' of the inner body and is affixed to it by rivets 17. The riveted central segments 15' and 16' of the inner and outer bodies constitute the middle portion of the connector.

On the right side of its central segment 16' in FIG. 3, the outer body 16 has an annular connecting segment 19 that extends out from its central segment 16' almost radially but with a slight inclination to the right and then forms a rounded corner at 20 with a long cylindrical side wall 21 that extends parallel to the inner body 15. The side wall 21 terminates in an outwardly flared, frusto-conical, end lip 22, which is located about midway between the central segment 15' and the inturned end lip 18 of the inner body 15. Thus, the inner body 15 extends a substantial distance beyond this end of the outer body 16.

Segments 19, 20, 21 and 22 of the outer body 16 and the cylindrical wall of the inner body 15 past its inwardly offset central segment 15' define an annular groove or recess 23 between the outer and inner bodies which is open at the end lip 22 of the outer body and closed at its annular connecting segment 19. Mastic 24 of known composition and properties fills this recess for part of its extent longitudinally of connector C, as shown in FIG. 3.

On the left side of its inwardly offset central segment 16', the outer body has an annular connecting segment 19a, a rounded annular corner 20a, a long cylindrical side wall 21a and an end lip 22a which are counterparts of the correspondingly numbered segments on the right side. The same type of mastic 24a fills the annular groove or recess 23a between the outer and inner bodies 16 and 15 to the left of the connecting segment 19a of the outer body.

On the opposite sides of their central segments 16' and 15', the outer and inner bodies 16 and 15 form opposite end segments of the connector for receiving the ducts 10 and 10a, respectively. The outer body 16 provides an annular outer member of each of these end segments of the connector which fits snugly around the corresponding spiral-wound air duct 10 or 10a. The inner body 15 provides an annular inner member of each end segment fitting snugly inside the corresponding duct. The annular outer and inner member of each end segment of the connector define between them the annular recess 23 or 23a which is open at one end to receive the corresponding duct 10 or 10a and closed at the opposite end by the connecting segment 19 or 19a of the outer body 16.

The inside diameter of duct 10 is substantially the same as the outside diameter of the inner body of the connector C on the right side of its central segment 15', so there is a snug sliding fit between duct 10 and the inner body 15 of the connector. The radial thickness of duct 10 from its inner diameter to the peak of each rib 12, 13 and 14 is substantially the same as the radial dimension of recess or groove 23 in the connector between its inner body 15 and the cylindrical side wall 21 of its outer body 16. Therefore, the connector C may be pushed onto the end of duct 10, or vice versa, with the ribs 12, 13 and 14 on the outside of the duct tightly received in the recess or groove 23 in the connector and the outside of the inner body 15 of the connector in metal-to-metal engagement with the inside of the duct. Initially, the inwardly bent end lip 18a of the inner body 15 of connector C facilitates its slidable reception in the duct. As the assembly proceeds, the outwardly bent lip 22 of connector C facilitates the entry of duct 10 into the annular groove or recess 23 between the outer and inner bodies 16 and 15 of the connector.

Preferably, as shown in FIG. 3, when the connector C is fully assembled on the duct 10, the end edge of the duct is at the blind end of recess 23, engaging the connecting segment 19 of the outer body 16 or very close to it. The mastic 24 flows around the inserted end of the duct and forms an air-tight seal between the duct and the connector.

The same type of assembly takes place between the left-hand duct 10a and the connector C at the other groove or recess 24a in the connector.

Figure 6:
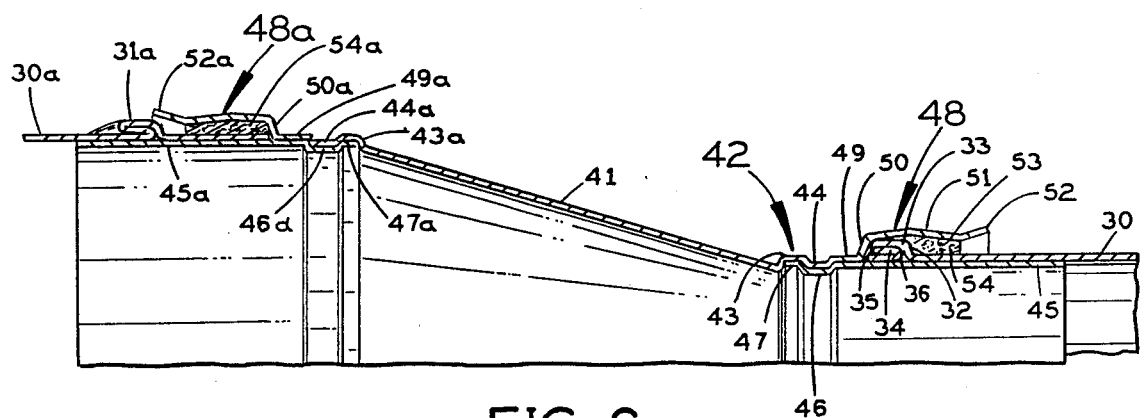
FIG. 6 is an enlarged longitudinal section taken along the line 6—6 in FIG. 5.
Figure 5:
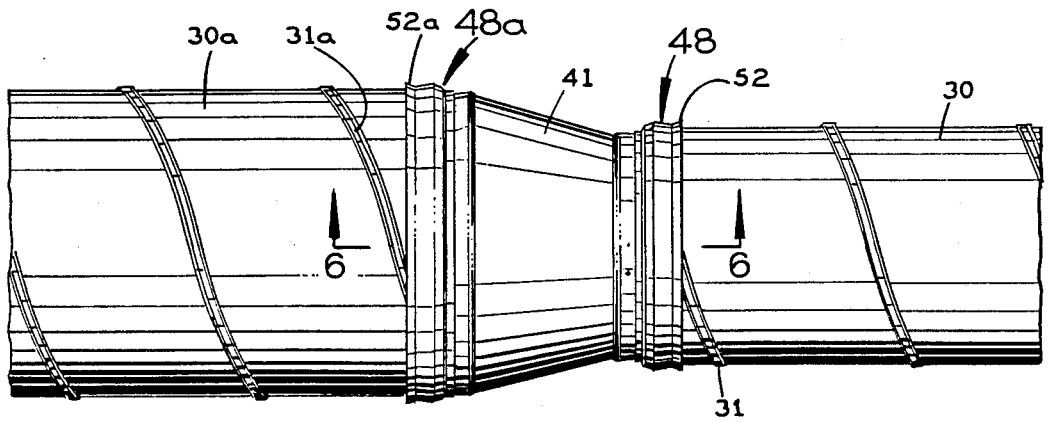
FIG. 5 is a side elevation showing the FIG. 4 connector attached to the air ducts.

FIGS. 4-6 show a second embodiment of the invention, which is a connector for two generally cylindrical, spiral-wound ducts of different diameters, for example, six and eight inches, respectively.

As shown in FIGS. 5 and 6, these ducts are of a known type of construction different from that of FIGS. 1-3 in that each duct has only a single spiral rib like the rib 11 or 11a in FIGS. 1-3. The duct 30 on the right side of the connector has a spiral rib in the form of a folded-over flattened seam 31 having an end segment 32 (FIG. 6) joined to the cylindrical wall of the duct and extend perpendicularly out from it a short distance, an outer segment 33 joined to the outer end of end segment 32 and extending perpendicularly from it in closely spaced, parallel relationship to the cylindrical wall of the duct, an inner segment 34 sandwiched between the outer segment 33 and the cylindrical wall of the duct, a curved end segment 35 joining segments 33 and 34 to each other and forming a 180 degree turn between them, and a connecting segment 36 joining the opposite end of inner segment 34 to the cylindrical wall of duct 30 and located next to the end segment 32. The radial thickness of rib 31 is substantially equal to twice the thickness of the sheet metal of which the duct is composed.

The larger diameter duct 30a on the left side has a single spiral seam or rib 31a of identical construction to that of the right-hand duct 30.

The connector 40 in FIGS. 4-6 has a central body with a frusto-conical side wall 41. At the smaller end of side wall 41 the central body of the connector has an annular segment 42 which presents in succession a cylindrical groove 43 on the inside and an inwardly offset, cylindrical, end segment 44.

The connector at this end has an annular inner body 45 which is cylindrical for its entire length except at an inwardly offset annular segment 46, which snugly receives the end segment 44 of the connector's central body 40, and an outwardly offset end segment 47, which fits snugly in the groove 43 on the inside of the central body.

The connector at this end has an annular outer body 48 with a cylindrical inner end segment 49 that snugly encircles the cylindrical segment of the inner body 45 next to the end of the connector's central body 40. The outer body 48 has a transverse, annular, connecting segment 50 joined to its inner end segment 49 and extending out from it, an annular side wall 51 joined to the outer edge of connecting segment 50 and extending from it away from the central body 40 of the connector and generally parallel to the cylindrical side wall of the inner body 45, and an outwardly flared annular end lip 52 joined to the side wall 51 at its opposite end from the connecting segment 50. End lip 52 on the outer body 48 is located about mid-way along the cylindrical side wall of the inner body 45. The side wall 51 of the outer body 48 is slightly outwardly bowed longitudinally.

The outer and inner bodies 48 and 45 at this end of the connector define an annular groove or recess 52 between them which is open at the end lip 52 on the outer body and is closed at its annular connecting segment 50. Mastic 54 is received in this recess.

Connector 40 has the same structural arrangement at its larger end on the left side in FIGS. 4-6, corresponding elements of which have the same reference numerals, with an "a" suffix added, as those on its smaller end.

The manner in which the connector is assembled to the two ducts is substantially the same as in the embodiment of FIGS. 1-3. The rib or seam 31 on the outside of the smaller duct (on the right side) has a sliding frictional fit in the recess 53 in the left end of connector 40, as shown in FIG. 6. The mastic 54 in this recess flows around this rib and the remainder of the inserted end of duct 30 and provides an air-tight seal between this duct and the connector. The same is true of the larger duct 30a and the connector.

Figure 7:
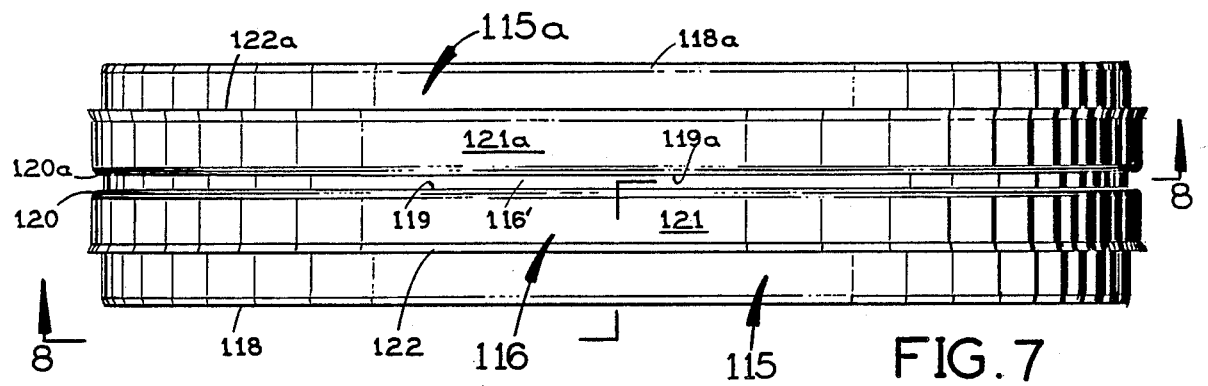
FIG. 7 is a side elevation of a third embodiment of this invention for connecting two flattened oval ducts of the same size.
Figure 8:
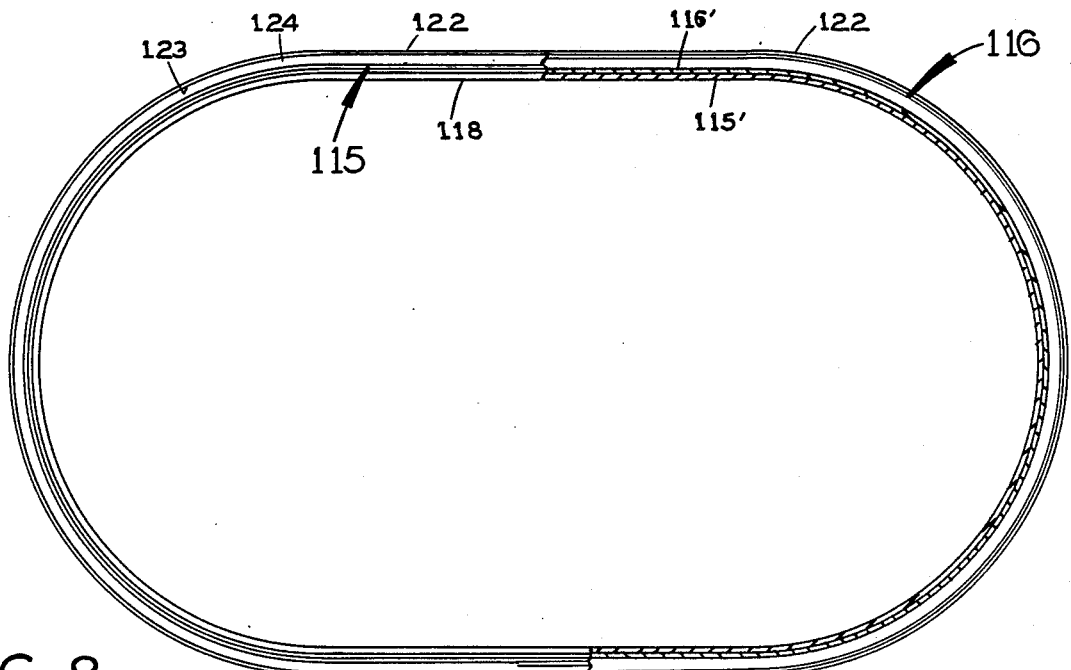
FIG. 8 is a view taken along the line 8—8 in FIG. 7 showing this connector partly in end elevation and partly in cross-section.
Figure 9:
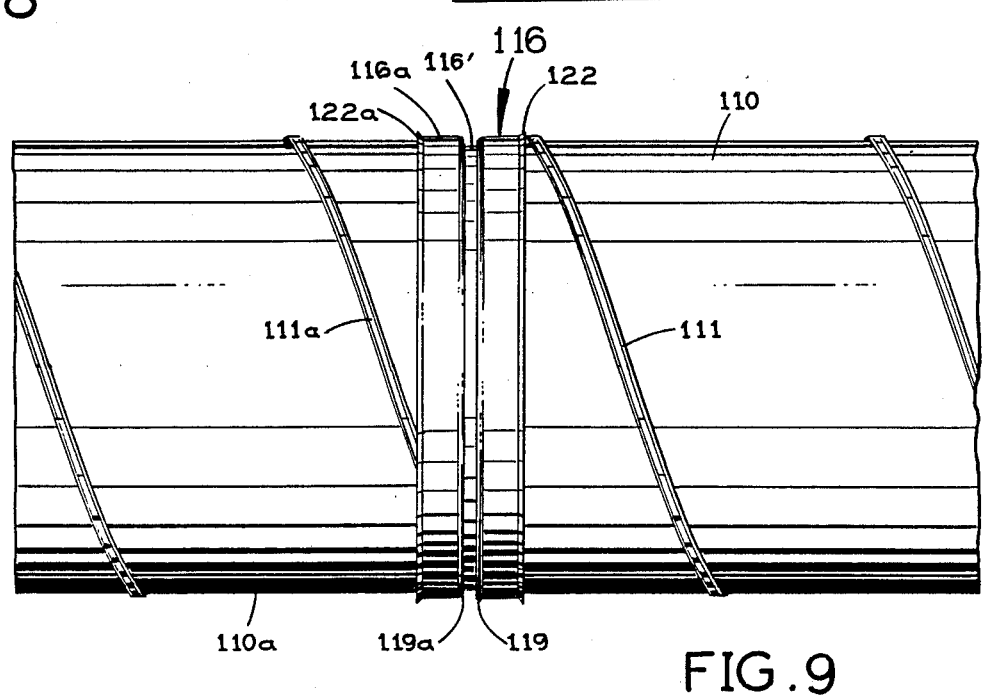
FIG. 9 is a side elevation showing the FIG. 7 connector attached to the air ducts.

FIGS. 7-9 disclose a third ebmodiment of the invention which is similar to the first embodiment (FIGS. 1-3) except that it is for connecting air ducts of oblong, flattened oval, cross-section. Elements of this third embodiment are given the same reference numerals plus 100 as the corresponding elements of the first embodiment so that the detailed description of these elements need not be repeated.

Each duct 110 and 110a (FIG. 9) is oblong in cross-section, with a flat top and a flat bottom and semi-cylindrical opposite sides connecting the top and bottom. Each duct has a single spiral-wound rib (111 on duct 110; 111a on duct 110a) in the form of a flattened bead like those in FIG. 6.

Likewise, the connector has an oblong cross-section of its outer body 116 and its inner body 115, which define oblong annular recesses between them which are open at the opposite ends of this connector and closed at the connecting segments 119 and 119a of outer body 116 on the opposite sides of its inwardly offset central segment 116. Each of these recesses is filled with mastic to sealingly engage the inserted end of corresponding duct 110 or 110a. The radial dimension of each of these recesses is substantially equal to the radial thickness of the corresponding duct where its projecting rib 111 or 111a is located. Therefore, each duct has a snug, sliding fit in the corresponding recess in the connector.

We claim:

1. An annular connector for connecting first and second air ducts, said connector having a central axis, interconnected recessed opposite end segments spaced apart along said axis for respectively receiving said first and second ducts, and an annular middle portion extending between and interconnecting said recessed end segments, each of said recessed end segments of the connector comprising:
    an annular outer member shaped and dimensioned to fit snugly but slidably around a spiral-wound air duct having an external spiral rib thereon;
    an annular inner member shaped and dimensioned to fit snugly inside said duct substantially beyond said outer member in the direction along said axis away from said middle portion of the connector, whereby to engage the inside of the corresponding duct substantially beyond said outer member in said direction;
    said outer and inner members defining between them an annular recess which is open at the end of said end segment away from said middle portion of the connector to receive said air duct and closed at its end next to said middle portion of the connector by said middle portion;
    and sealing mastic filling said recess at said closed end for substantially air-tight engagement with the end of said duct received in said recess.

2. A connector according to claim 1 wherein said annular middle portion is a frusto-conical central body between said opposite end segments to provide a transition between a first duct of one diameter and a second duct of different diameter received respectively in said annular recesses in said opposite end segments of the connector.

3. A connector according to claim 2 wherein:
    said annular outer member of each of said end segments has an annular side wall extending a substantial distance away from said central body, a transverse annular connecting segment providing the closed end of the corresponding recess in the connector, and an outwardly flared annular end lip on the end of said annular side wall away from said central body.

4. A connector according to claim 1 wherein said outer member and said inner member of each of said recessed end segments are cylindrical for most of the extent of the corresponding annular recess from said open end to said closed end of said recess.

5. A connector according to claim 1 wherein said outer member and said inner member of each of said recessed end segments are flattened ovals for most of the extent of the corresponding annular recess from said open end to said closed end of said recess.

6. A connector for connecting first and second air ducts, said connector having interconnected opposite end segments for respectively receiving said first and second ducts, each of said end segments of the connector comprising:
    an annular outer member shaped and dimensioned to fit snugly but slidably around a spiral-wound air duct having an external spiral rib thereon;
    an annular inner member shaped and dimensioned to fit snugly inside said duct;
    said outer and inner members defining between them an annular recess which is open at one end to receive said air duct and closed at its opposite end at a location spaced along said connector from said open end;
    and sealing mastic filling said recess at said closed location for substantially air-tight engagement with the end of said duct received in said recess;
    said annular outer member of each of said end segments being part of an outer body also having an inwardly offset central segment between said outer members of said end segments;
    said annular outer member of each of said end segments having an annular side wall extending a substantial distance away from said central segment, a transverse annular connecting segment joining said annular side wall to said central segment and providing the closed end of the corresponding recess in the connector, and an outwardly flared annular end lip on the end of said annular side wall away from said central segment;
    said annular inner member of each of said end segments being part of an inner body also having an inwardly offset central segment between said inner members of said end segments;
    said central segment of said outer body closely surrounding said central segment of said inner body and being rigidly attached thereto;
    and said annular inner members of said end segments extending from said central segment of said inner body substantially beyond said flared end lips of the outer body.

7. A connector according to claim 6 wherein said inner body has inwardly inclined annular lips on its opposite ends beyond said flared end segments of the outer body.

8. A connector according to claim 7 wherein said annular side walls of the outer body and said annular inner members of the inner body are substantially cylindrical.

9. A connector according to claim 7 wherein said annular side walls of the outer body and said annular inner members of the inner body are flattened ovals.

10. A connector for connecting two spiral-wound sheet metal air ducts, said connector comprising a unitary annular structure with recessed opposite annular end segments and an annular middle portion extending between and interconnecting said end segments, each of said end segments presenting an annular recess which is open at its outer end away from said middle portion and closed at its inner end next to said middle portion by said middle portion, and mastic filling the closed inner end of each recess, each of said recesses having a transverse dimension along most of its length along the connector substantially equal to the maximum thickness of the corresponding spiral-wound duct for snugly but slidably receiving said duct.

* * * * *